(12) United States Patent
Merlet et al.

(10) Patent No.: US 7,872,077 B2
(45) Date of Patent: Jan. 18, 2011

(54) GRAFTED POLYMERS AND METHODS OF MAKING AND USING THEREOF

(75) Inventors: Stephanie Merlet, Corbeil-Essonnes (FR); Florence Andrioletti, Charenton-le-Pont (FR); William LaMarca, Cregy les Meaux (FR); Benoit Abribat, Saint Fargeau Ponthierry (FR)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 12/014,213

(22) Filed: Jan. 15, 2008

(65) Prior Publication Data

US 2008/0214765 A1  Sep. 4, 2008

(30) Foreign Application Priority Data

Jan. 16, 2007  (EP) .................................. 07000741

(51) Int. Cl.
*C08F 8/44* (2006.01)
(52) U.S. Cl. .................... 525/330.2; 525/107; 525/119; 525/327.7; 525/327.8; 525/329.7; 525/330.1; 525/330.3; 525/366; 525/451; 526/317.1; 526/318; 526/318.43; 526/321
(58) Field of Classification Search ................. 525/451, 525/327.7, 327.8, 327.4
See application file for complete search history.

(56) References Cited

U.S. PATENT DOCUMENTS

| | | | |
|---|---|---|---|
| 3,437,619 A | 4/1969 | Nutt | |
| 3,547,760 A | 12/1970 | Oberst et al. | |
| 4,052,438 A * | 10/1977 | Papenfuhs | ................... 560/61 |
| 5,614,017 A | 3/1997 | Shawl | |
| 6,939,935 B2 | 9/2005 | Valls et al. | |
| 2003/0013842 A1 | 1/2003 | Kroner et al. | |
| 2004/0157958 A1 * | 8/2004 | Vincent et al. | .............. 523/160 |

FOREIGN PATENT DOCUMENTS

| | | |
|---|---|---|
| EP | 1 260 536 A1 | 11/2002 |
| EP | 1 319 676 A1 | 6/2003 |
| EP | 1 396 506 A1 | 3/2004 |
| EP | 1 657 260 A1 | 5/2006 |
| EP | 1 721 915 A1 | 11/2006 |
| EP | 1721915 * | 11/2006 |
| FR | 2 776 285 A1 | 3/1998 |
| GB | 1 404 795 A | 9/1975 |
| GB | 1 432 782 A | 4/1976 |
| JP | 54-99195 A | 8/1979 |
| WO | WO 97/39037 A1 | 10/1997 |
| WO | WO 2006/050850 A1 | 5/2006 |

OTHER PUBLICATIONS

Lacroix-Desmazes et al., Reactive Surfactants in Heterophase Polymerizatino. 2. Maleate Based Poly(ethylene oxide) Macromers as Steric Stabilizer Precursors in the Dispersion Polymerization of Styrene in Ethanol-Water Media, Macromolecules, 1996, 29, 4508-4515.*

* cited by examiner

*Primary Examiner*—James Seidleck
*Assistant Examiner*—Robert C Boyle

(57) ABSTRACT

Grafted polymers which are the reaction products of:
(a) (Meth)acrylic acid and
(b) Non-symmetric maleates according to general formula (I),

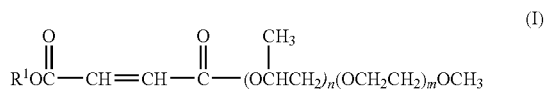

in which $R^1$ stands for a linear or branched alk(en)yl radical having 1 to 22 carbon atoms and 0 or 1 double bond, while n and m independently represent integers between 0 and 200, on condition that the sum (n+m) is different from 0 are disclosed. Methods of making and using the grafted polymers are also disclosed.

13 Claims, No Drawings

GRAFTED POLYMERS AND METHODS OF MAKING AND USING THEREOF

CROSS-REFERENCE TO RELATED APPLICATIONS

The present application claims priority under 35 U.S.C. Section 119 of EP07000741.4 filed Jan. 16, 2007, the contents of which are incorporated herein by reference in its entirety.

FIELD OF THE INVENTION

The present invention relates to the area of polymers and refers to novel grafted polymers, a process for their production and their use as super-plasticizers for concrete or plaster retarders.

BACKGROUND OF THE INVENTION

Polyolefinic acids, particularly polyacrylic acids, grafted with polyglycolethers and monomethylpolyglycolethers (MPEG) and their use as super-plasticizers are well known from literature. They provide high fluidity to high-strength cement and concrete compositions combined with an extremely low water-to-cement or concrete ratio. In addition they reduce the decrease in fluidity, which takes place after a certain time, and control the generation of foam during the making of the final preparations. Examples for the state of the art can be found inter alia in FR 2776285 B1 (Chryso), EP 1260536 A1 (BASF) or WO 97/039037 A1 (Mbt). Usually, manufacture of the grafted polymers takes place in two steps: firstly, the free-radical polymerization is carried out in water, and then the esterification is conducted. Of course, prior to esterification the water has to be removed, which makes the process time-consuming and not very efficient.

In this context, reference is also made to international patent application WO 06/050850 A1 (Cognis) disclosing anionic polymers useful as super-plasticizers for concrete, which are obtained by polymerization of (meth)acrylic acid or their esters with dipropylendiglycolacrylate (DPGDA), tripropylenglycoldiacrylate (TPGDA), acrylamidomethyl propanesulfonic acid (AMPS) and/or acryl acetate (AA) and subsequent treatment of the intermediates with mixtures of short- and long-chain alkylpolyalkyleneglycols. Another group of concrete plasticizers obtained from the polymerization of maleic acid (anhydride) and (meth)acrylic acid is known from EP 1319676 A1 (Cognis). Polyacrylic acids grafted by polyethyleneglycols and their use as superplasticizers for concrete is also known from EP 1396506 A1 (Cognis). Finally, WO 97/39037 A1 (Sandoz) describes the use of a styrene/maleic acid anhydride co-polymer, post-esterified with a mono-methoxy polyglycol ether for the same purpose; the maleate moiety, however, has a symmetric structure. Nevertheless, none of the polymers known from the state of the art simultaneously fulfil all requirements of the proposed application.

Therefore, the present invention is directed to providing novel polymers with improved super-plasticizing and retarding properties in order to overcome the disadvantages known from the state of the art. In particular, the polymers of the invention provide for an extremely low water-to-cement or concrete ratio, high slump retention while maintaining good flowability, as well as low foam formation during the preparation of the cement or concrete.

SUMMARY AND DESCRIPTION OF THE INVENTION

The present invention provides novel grafted polymers, which are the reaction products of:
(a) (Meth)acrylic acid and
(b) Non-symmetric maleates according to general formula (I),

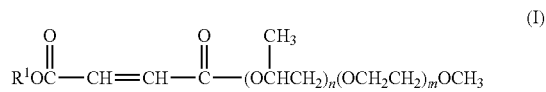

in which $R^1$ stands for a linear or branched alk(en)yl radical having 1 to 22 carbon atoms, preferably 6 to 18 carbon atoms and 0 or 1 double bond, while n and m independently represent integers between 0 and 200, preferably between 2 and 100, and most preferably between 5 and 50, on condition that the sum (n+m) is different from 0.

Components (a) and (b) described above are subjected to copolymerization. The reaction products thus obtained are subsequently neutralized with an alkaline base and solubilized in an aqueous solution such as water.

Surprisingly it has been found that due to the particular structure of the maleate moiety, both the polyglycolether chains and the alkyl chains are located on the grafted polymer leading to improved super-plasticizing properties in cement and concrete, in particular with respect to
- extremely low water-to-cement or concrete ratio,
- high slump retention while maintaining good flowability, and
- foam control during cement or concrete preparation.

In addition, the non-symmetric maleate allows the incorporation of polyglycolether groups and also alkyl chains into the polymer, which is generally rather difficult due to their poor solubility in water.

Process

Another embodiment of the present invention is directed to a process for the manufacture of grafted polymers comprising;
(i) subjecting mixtures of (meth)acrylic acid and non-symmetric maleates according to general formula (I),

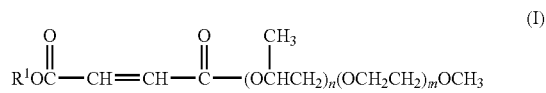

in which $R^1$ stands for a linear or branched alk(en)yl radical having 1 to 22 carbon atoms, preferably 6 to 18 carbon atoms and 0 or 1 double bond, while n and m independently represent integers between 0 and 200, preferably between 1 and 100, and most preferably between 5 and 50, on condition that the sum (n+m) is different from 0, to a free-radical polymerization;
(ii) neutralizing the acid groups of the polymers thus obtained with an alkaline base; and
(iii) solubilizing the neutralized polymers in an aqueous solution.

Firstly, the non-symmetric maleate is prepared by a two-step esterification by a methyl-capped polyglycolether, which is followed by a fatty alcohol. Suitable methyl-capped polyglycolethers possess average molecular weights of 100 to 10000, preferably 200 to 6000 and most preferably 350 to 5000 Daltons. The polyether can be ethylene oxide or propylene oxide units only, however, it is also desirous to have mixtures present, either in random or in block distribution. If mixed methyl-capped polyglycolethers are used as starting materials, the number of ethylene oxide units is preferably between 0 and 120 and the number of propylene oxide units between 0 and 120. The maleic acid semi-ester thus obtained is subsequently esterified with a saturated or unsaturated synthetic or natural fatty alcohol having 1 to 22 carbon atoms, and preferably 6 to 16 carbon atoms. Suitable examples are capryl alcohol, 2-ethyl hexyl alcohol, lauryl alcohol, isotridecyl alcohol, myristyl alcohol, cetyl alcohol, stearyl alcohol, cetearyl alcohol, oleyl alcohol, elaidyl alcohol, gadoleyl alcohol, arachidonyl alcohol, erucyl alcohol, behenyl alcohol and their technical mixtures. The preferred alcohols are lauryl and coco fatty alcohol. The esterification is conducted according to the state of the art at elevated temperatures of about 80° C. to about 130° C., and optionally under a reduced pressure of about 10 mbar. The water formed during the condensation can be removed continuously from the reaction mixture in order to shift the equilibrium to the product side.

Once the non-symmetric maleate has been prepared, it is transferred together with the (meth)acrylic acid into a second flask where the polymerization takes place. The two monomers can be used in a weight ratio (a):(b) of from 1:99 to 99:1, preferably 2:98 to 40:60, and most preferably 5:95 to 25:75. The polymerization is conducted according to methods known in the art and usually takes place in aqueous solution at elevated temperatures of about 60° C. to about 100° C., and preferably about 80° C. and is commenced by the addition of a conventional initiator, such as, for example, ammonium persulfate. Once the polymerization is completed, the reaction mixture is cooled and treated with an alkaline base, preferably an aqueous sodium or potassium hydroxide solution in a quantity sufficient to neutralize the acidic functions in the polymer and to pre-pare salts thereof. The reaction products can then be diluted by addition of water in order to adjust to the desired active polymer content of typically 20 to 50% b.w., and preferably about 35% b.w.

INDUSTRIAL APPLICATION

The grafted polymers obtained according to the present invention provide high fluidity and better workability to cement, concrete and plaster compositions. Another object of the present invention is therefore the use of the polymers as so-called super-plasticizers for concrete or plaster retarders.

The following examples are illustrative of the invention and should not be construed in any manner whatsoever as limiting the scope of the present invention.

EXAMPLES

Example 1

Preparation of a Non-Symmetric Maleate 18 g of lauryl alcohol was placed in a 150-ml reactor at room temperature. The alcohol was heated to 90° C. and melted. Then 9.5 g maleic anhydride was added and the reaction temperature maintained at 90° C. until an acid value of 200 mg KOH/g (about 4 hours of reaction) was reached. Then 71.5 g of mono-methoxy poly(ethylene glycol) 750 Dalton and 1 g of the esterification catalyst sulphuric acid were added. The mixture was maintained under a reduced pressure of 10 mbar and at 90° C. for 6 hours. The final acid value was about 12 mg KOH/g.

Example 2

Preparation of a Non-Symmetric Maleate 8 g of lauryl alcohol was placed in a 150-ml reactor at room temperature. The alcohol was heated to 90° C. and melted. Then 4.3 g maleic anhydride was added and the reaction temperature maintained at 90° C. until an acid value of 200 mg KOH/g (about 4 hours of reaction) was reached. Then 86.7 g of mono-methoxy poly(ethylene glycol) 2000 Dalton and 1 g of the esterification catalyst sulphuric acid were added. The mixture was maintained under a reduced pressure of 10 mbar and at 90° C. for 6 hours. The final acid value was about 12 mg KOH/g.

Example 3

Preparation of the Grafted Polymer 32 g of the non-symmetric maleate obtained according to Example 1 and 8 g acrylic were placed in a 250-ml-polymerization flask at room temperature. The mixture was diluted with 58.6 ml water and set under nitrogen bubbling in order to remove all traces of oxygen. Then the mixture was heated to about 80° C. and 1.4 g initiator (ammonium persulfate) was added. Since the polymerization represents an exothermic reaction, the flask was cooled in order to maintain a reaction temperature of 80 to 90° C. Once the polymerization was completed, the product was cooled to room temperature and treated with aqueous sodium hydroxide solution to neutralize the acidic groups in the polymer and diluted with water to adjust to a polymer content of 30% b.w.

Example 4

Preparation of the Grafted Polymer 36 g of the non-symmetric maleate obtained according to Example 2 and 4 g acrylic were placed in a 250-ml-polymerization flask at room temperature. The mixture was diluted with 59.3 ml water and set under nitrogen bubbling in order to remove all traces of oxygen. Then the mixture was heated to about 80° C. and 0.7 g initiator (ammonium persulfate) was added. Since the polymerization represents an exothermic reaction, the flask was cooled in order to maintain a reaction temperature of 80 to 90° C. Once the polymerization was completed, the product was cooled to room temperature and treated with aqueous sodium hydroxide solution to neutralize the acidic groups in the polymer and diluted with water to adjust to a polymer content of 30% b.w.

What we claim is:

1. A grafted polymer, formed by the process comprising polymerizing a mixture consisting of:
   (a) (Meth)acrylic acid and
   (b) at least one non-symmetric maleate according to general formula (I),

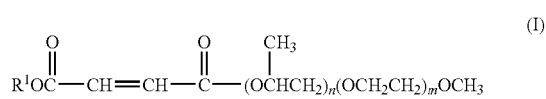

in which $R^1$ stands for a linear or branched, alkyl or alkenyl moiety having 1 to 22 carbon atoms and 0 or 1 double bond, while n and m independently represent integers between 0 and 200, provided that the sum (n+m) is different from 0.

2. The polymer of claim 1 wherein $R^1$ of formula (I) comprises a linear or branched alkyl or alkenyl moiety having 6 to 18 carbon atoms.

3. The polymer of claim 2 wherein $R^1$ comprises a lauryl group.

4. The polymer of claim 1 wherein (a) and (b) are present in a weight ratio of from 1:99 to 99:1.

5. The polymer of claim 4 wherein (a) and (b) are present in a weight ratio of from 5:95 to 25:75.

6. A process of making a grafted polymer comprising:
(i) subjecting a mixture consisting of (a) (meth)acrylic acid and (b) non-symmetric maleates according to general formula (I),

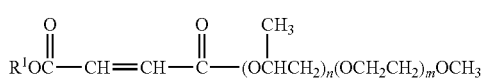
(I)

in which $R^1$ stands for a linear or branched alk(en)yl radical having 1 to 22 carbon atoms and 0 or 1 double bond, while n and m independently represent integers between 0 and 200, on condition that the sum (n+m) is different from 0, to a free-radical polymerization to form a polymer;
(ii) neutralizing the acid groups of the polymer thus obtained with an alkaline base; and
(iii) solubilizing the neutralized polymer in an aqueous solution.

7. The process of claim 6, wherein the n and m of general formula (I), each represent an integer of between 0 and 120.

8. The process of claim 6 wherein $R^1$ is an alkyl radical having 6 to 18 carbon atoms.

9. The process of claim 8 wherein the alkyl radical is an alcohol.

10. The process of claim 6 wherein (a) and (b) are present in a weight ratio of from 1:99 to 99:1.

11. The process of claim 6 wherein the solubilized polymer is present in the aqueous solution in an amount of from 20 to 50% by weight.

12. A method of using the grafted polymer of claim 1 which comprises adding the polymer to concrete or a plaster retarder.

13. An aqueous polymer solution comprising from 20% to 50% by weight of the grafted polymer of claim 1, based on the weight of the solution.

* * * * *